US008347618B2

(12) United States Patent
Dostal et al.

(10) Patent No.: US 8,347,618 B2
(45) Date of Patent: Jan. 8, 2013

(54) DUAL PUMP HYDRAULIC SYSTEM

(75) Inventors: Gary L. Dostal, Cedar Falls, IA (US); Steven D. Wallestad, Cedar Falls, IA (US); Dennis L. Jeffries, Waterloo, IA (US); Ryan Lindsay, Waterloo, IA (US)

(73) Assignee: Deere & Company, Moline, IL (US)

( * ) Notice: Subject to any disclaimer, the term of this patent is extended or adjusted under 35 U.S.C. 154(b) by 910 days.

(21) Appl. No.: 12/464,993

(22) Filed: May 13, 2009

(65) Prior Publication Data

US 2010/0287924 A1 Nov. 18, 2010

(51) Int. Cl.
*F15B 11/02* (2006.01)
*F16H 57/04* (2010.01)

(52) U.S. Cl. .......................................... 60/428; 60/430

(58) Field of Classification Search .................... 60/421, 60/428, 430, 486
See application file for complete search history.

(56) References Cited

U.S. PATENT DOCUMENTS

| | | | | |
|---|---|---|---|---|
| 5,295,737 | A | 3/1994 | Epple et al. | |
| 5,360,322 | A | 11/1994 | Henein et al. | |
| 5,826,676 | A * | 10/1998 | Ko | 180/403 |
| 6,332,316 | B1 * | 12/2001 | Morimoto et al. | 60/421 |
| 6,460,655 | B2 * | 10/2002 | Miller | 184/6.1 |
| 7,401,465 | B2 * | 7/2008 | Emmert et al. | 60/430 |
| 7,562,472 | B2 * | 7/2009 | Tozawa et al. | 37/348 |

FOREIGN PATENT DOCUMENTS

| | | |
|---|---|---|
| DE | 10327406 | 2/2005 |
| DE | 102004058261 | 6/2006 |
| DE | 102008040667 | 1/2010 |
| WO | WO 2006129422 A1 * | 12/2006 |
| WO | 2008078941 | 7/2008 |

* cited by examiner

*Primary Examiner* — Thomas E Lazo

(57) ABSTRACT

A dual pump hydraulic system is provided for a vehicle driven by an internal combustion engine. The system includes a first circuit with a first high pressure pump supplying hydraulic fluid to the first subsystem at a higher pressure. The system also includes a second circuit with a second lower pressure pump supplying hydraulic fluid to the second subsystem at a second pressure. A first valve controls communication between the first pump and the second circuit. A second valve is operable to communicate the second pump with the first circuit when pressure in the first circuit is less than a second threshold pressure or when commanded by a control unit. A check valve prevents fluid flow from the first circuit back into to the second valve.

17 Claims, 2 Drawing Sheets

DUAL PUMP HYDRAULIC SYSTEM

FIELD OF THE INVENTION

The present invention relates to a dual pump hydraulic system for a vehicle, such as for a vehicle having a transmission hydraulic control, cooling, and lubrication system.

BACKGROUND OF THE INVENTION

Current production hydraulically controlled transmission systems normally include a single hydraulic pump driven mechanically by the engine. This single pump provides hydraulic fluid to all fluid consuming subsystems, such as the hydraulic transmission control valve circuit and the transmission lubrication circuit. This single pump will deliver hydraulic fluid at the highest pressure required by any one of the subsystems. This pressure may exceed the pressure required for some of the subsystems. Thus, excessive power loss is caused by pumping oil at higher flow and higher pressure than necessary to fulfill sub-system requirements. The mechanically driven transmission pump provides a flow rate proportional to engine speed, rather than the flow required by the subsystem.

U.S. Pat. No. 7,401,465 was issued July 2008 to Emmert et al, and is assigned to the assignee of the present application. The system shown in the '465 patent includes two pumps, one pump operating at 30 bar to fill the hydros for an IVT, and one pump operating at 20 bar for clutches which flows over a pressure regulating valve to the cooler and lubrication circuit. The higher pressure pump cascades oil into the lower pressure pump circuit (only downhill flow). In this system fluid cannot flow from the low pressure pump into the higher pressure circuit. It is desired to have a two pump system wherein the lower pressure pump can be commanded to provide flow into the high pressure circuit to assist the higher pressure pump.

SUMMARY OF THE INVENTION

Accordingly, an object of this invention is to provide a hydraulic system with multiple pumps, either or both of which may be mechanically and/or electrically driven.

A further object of the invention is to provide such a system which includes an electrically driven pump which may be electronically controlled to vary pump drive speed to provide only the flow desired, resulting in a power savings.

A further object of the invention is to provide such a system which can, when utilizing electric motor driven pumps, provide adequate pressure and flow at cold oil start up conditions.

A further object of the invention is to provide a two pump system wherein the lower pressure pump can be commanded to provide flow into the high pressure circuit to assist the higher pressure pump.

These and other objects are achieved by the present invention, wherein a hydraulic system is provided for a vehicle driven by an internal combustion engine. The hydraulic system includes a first circuit which has a first pump and a first hydraulic subsystem. The first pump supplies hydraulic fluid to the first subsystem at a first pressure, and is preferably driven by an electric motor. The hydraulic system also includes a second circuit which has a second pump and a second hydraulic subsystem. The second pump supplies hydraulic fluid to the second subsystem at a second pressure, and is preferably mechanically driven. A first valve is operable to communicate the first pump with the second circuit when pressure in the first circuit exceeds a first threshold pressure. A second valve is operable to communicate the second pump with the first circuit when pressure in the first circuit is less than a second threshold pressure. The second valve is connected to the first circuit via a check valve which prevents fluid flow from the first circuit to the second valve.

DESCRIPTION OF THE PREFERRED EMBODIMENT

Figure 1:
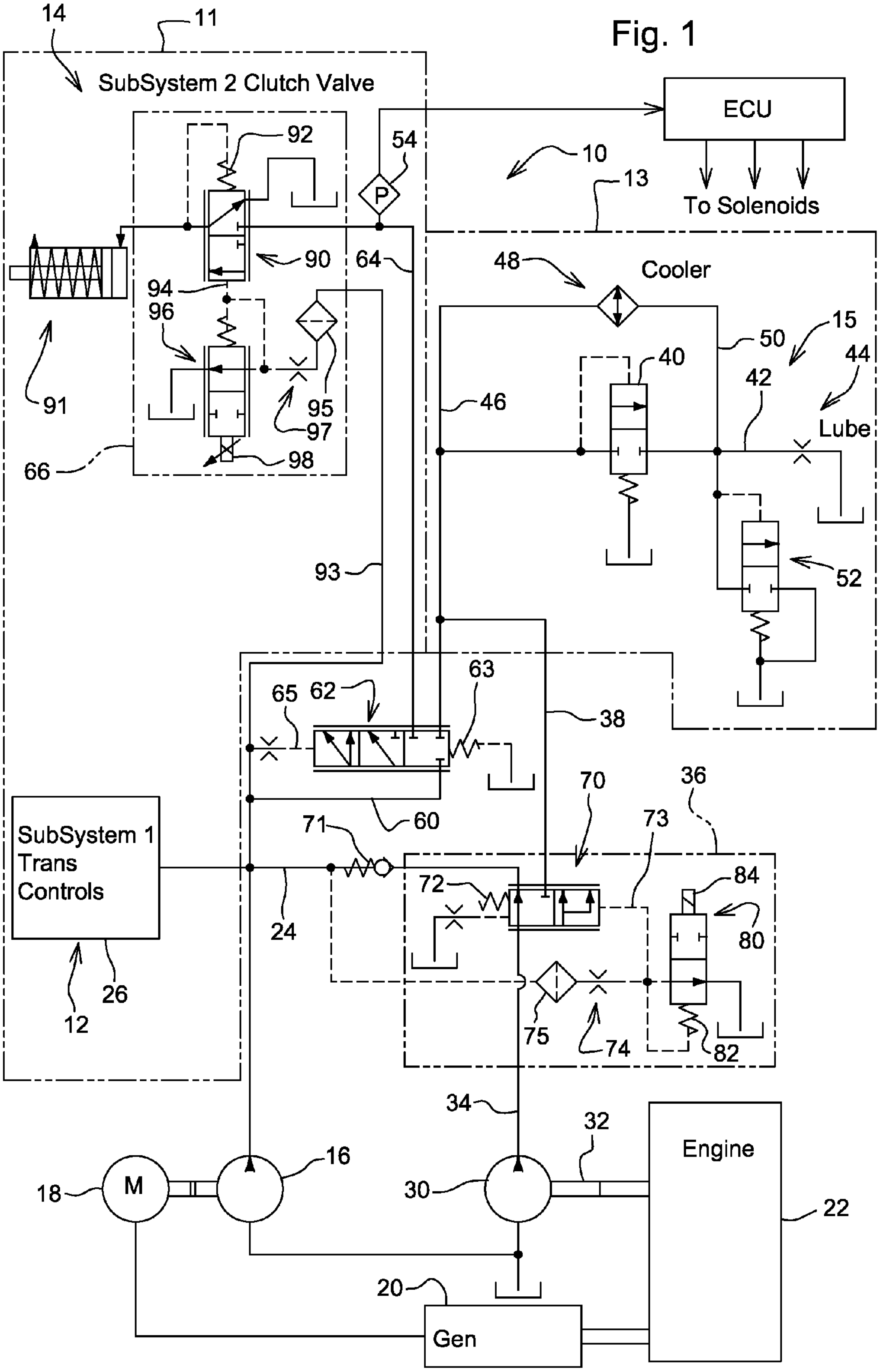
FIG. 1 is a schematic diagram illustrating the invention.

Referring to FIG. 1, the dual pump hydraulic system 10 includes a first circuit or system 11 and a second circuit or system 13. First system 11 includes a transmission control hydraulic circuit 12 and a clutch control circuit 14. The second system 13 includes a transmission lube and cooling circuit 15. The transmission control circuit 12 includes a higher pressure transmission control pump 16 which may be driven by an electric motor 18 which is preferably powered by a generator or alternator 20 driven by the engine 22. Line 24 communicates pump 16 to the transmission controls 26. Pump 16 may be driven by electric motor 18 or it may be driven mechanically by the engine, such as by a belt or shaft drive (not shown). The transmission controls 26 may be the controls for a powershift transmission (not shown) or for the hydrostatic pump or motor of a infinitely variable transmission (IVT) (not shown).

A lube and cooling lower pressure pump 30 may be driven mechanically by the engine 22, such as by a belt or shaft drive 32. Pump 30 may be driven purely mechanically as shown, or it may be driven by an electric motor (not shown) which is preferably powered by a generator or alternator (not shown) driven by the engine 22. Line 34 communicates pump 30 to a boost valve unit 36. Line 38 communicates an outlet of boost valve unit 36 to a cooler bypass valve 40. Line 42 communicates cooler bypass valve 40 to lube circuit 44. Line 46 communicates line 38 to cooler circuit 48. Line 50 communicates cooler circuit 48 to line 42. Lube relief valve 52 connects line 42 to sump if pressure in line 42 exceeds a threshold pressure.

Line 60 communicates line 24 to an inlet of a 3-position pressure regulator valve 62. A first outlet of valve 62 is communicated to lines 38 and 46, and thus to cooler 48 and cooler bypass valve 40, respectively. A second outlet of valve 62 is communicated by line 64 to a system 2 clutch valve unit 66. Valve 62 is biased by spring 63 to a first position wherein both outlets are blocked. A pilot 65 connected via an orifice to line 60. The pilot 65 urges valve 62 to a second position wherein its first outlet is blocked and its second outlet is connected to line 60, and to a third position wherein the first and second outlets are connected to line 60. A pressure sensor 54 senses pressure in line 64 and provides a sensed pressure signal to an electronic control unit (ECU) 68.

Boost valve unit 36 includes a 2-position pilot operated proportional boost valve 70 and a solenoid operated proportional boost pilot valve 80. The inlet of boost valve 70 is connected by line 34 to the outlet of pump 30. A first outlet of valve 70 is connected to line 24 and first system 11 via a check valve 71. A second outlet of valve 70 is connected to line 38 and the second system 13. Valve 70 is biased by spring 72 to a first position wherein its second outlet is blocked and its inlet is communicated with the first outlet. Pilot line 73 is communicated with line 60 and the outlet of pump 16 via an orifice 74 and a filter 75. Valve 70 is movable by pilot 73 to a second position wherein its inlet is communicated with its first and second outlets.

Pilot valve 80 controls communication between pilot 73 and reservoir. Pilot valve 80 is biased by spring 82 to an open position and is movable to a closed position by solenoid 84.

Clutch valve unit 66 includes a 2-position proportional valve 90 which controls communication between line 64 and a clutch 91. Clutch 91 may be a traction clutch or a shift clutch for shifting between gear ranges in a powershift transmission. Valve 90 is biased by spring 92 to a position wherein communication is blocked between line 64 and a clutch 91, and wherein clutch 91 is communicated with the reservoir. A pilot 94 urges valve 90 to a second position wherein line 64 is communicated with clutch 91. Pilot 94 is connected to line 60 by pressure sense line 93 via filter 95 and orifice 97. The pressure in pilot 94 is controlled by a 2-position proportional solenoid operated pilot valve 96. Valve 96 is biased by spring 98 to a position wherein pilot 94 is communicated with the reservoir. Solenoid 98 urges valve 96 to a position wherein communication is blocked between pilot 94 and the reservoir. Although a single clutch 91 and a single clutch valve unit 66 is shown in FIG. 1, it should be understood that there could be a plurality of clutches, each controlled by a separate corresponding clutch valve unit.

Mode of Operation

Pump 16 normally provides high pressure hydraulic fluid to the transmission controls 26 of the first system 11. When the pressure in lines 26 and 60 exceeds a threshold, valve 62 moves to its second position and communicates oil to line 64 and the clutch valve unit 66 of the first system 11. At a higher pressure in lines 26 and 60, valve 62 moves to its third position and communicates oil to line 64 and the clutch valve unit 66 and to line 46 and oil cooler 48 of the second system 13.

Normally, when boost valve 70 is in the closed position illustrated, fluid from pump 30 will be communicated to the first system 11 through check valve 71. This is preferably done at lower engine speeds. The boost valve 70 is preferably moved to its boost position (shown) when ECU 68 de-energizes solenoid 84 in response to low pressure being sensed by pressure sensor 54. Thus, valve 70 allows the flow from the mechanical pump 30 to augment the flow from electrical driven pump 16 under conditions like cold oil when the electrical driven pump 16 cannot provide the desired flow and pressure. If solenoid 84 is energized, boost pilot valve 80 will close and cause boost valve 70 to move to its open position wherein fluid from pump 30 will be communicated to the second system through line 38, and higher pressure in lines 24 and 60 keeps check valve 71 closed and prevents boost valve 70 from communication fluid from pump 30 to line 24 and first system 11.

It would be possible to control the boost valve 70 as a function of inputs other than or addition to pressure alone, such as flow rates. Or, valve 70 could be controlled as a function of pre-determined values stored and or programmed into the ECU 68, such as a table with input parameters that signal when the valve 70 should be shuttled.

The system describe above utilizes multiple pumps, either or both of which may be either mechanically or electrically driven. Any electrically driven pump may be electronically controlled to vary pump drive speed to provide only the flow desired, resulting in a power savings.

Any such mechanically driven pump may provide additional flow to other circuits at only the pressure required for their need. The invention also involves an interconnection between the pumps to allow one pump circuit to be routed into another pump circuit. This provides a support function by adding flow to the higher pressure circuit from the normally lower pressure circuit for short periods of time. These periods could occur during a transmission shift function, hydro stroke adjustment, or cold oil flow limiting conditions.

In addition, the pumps may be sized for minimal displacement to save space and cost. All pumps would run at high pressure at low engine drive speeds into the high pressure circuit and excess flow would cascade down to the lower pressure circuit. As the engine speed increases and corresponding mechanically driven pump flow increases the electric motor driven pump flow would decrease to maintain the same output power. Once a threshold is reached the mechanically driven pump would shift back to supply only the lower pressure circuit need and the electrically driven pump continues to provide the higher pressure circuit.

The electrically driven pump output flow is not necessarily coupled to engine speed and can be varied as needed. This allows additional reduction of power loss over and above that previously obtained with a dual mechanically driven pump system. The result is a system that has lower parasitic losses and has adequate functional performance at low oil temperatures.

Figure 2:
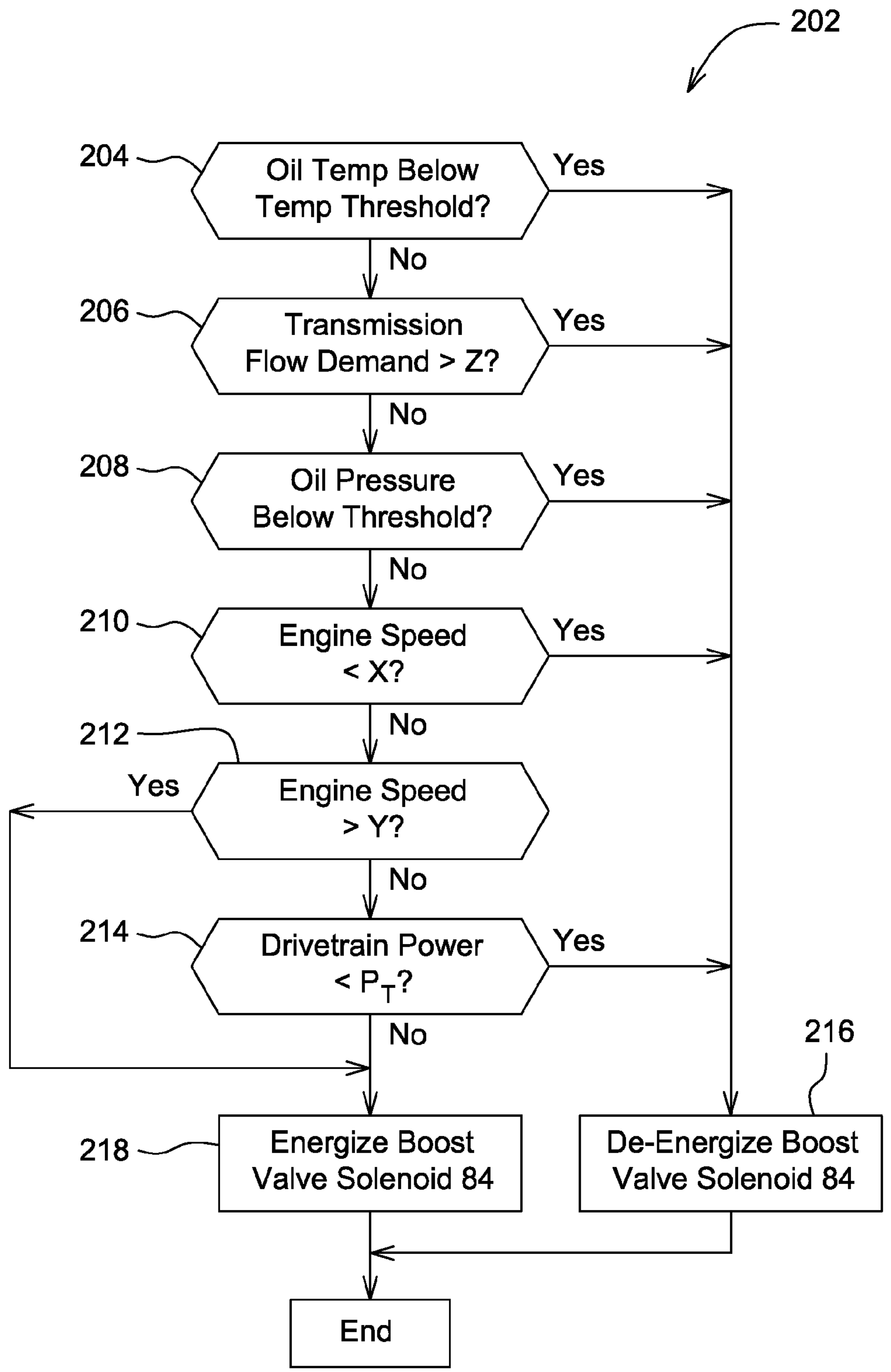
FIG. 2 is a logic flow diagram of control logic which could be executed by the ECU of FIG. 1.

Referring now to FIG. 2, ECU 68 may be programmed to execute a control algorithm 202 illustrated by the flow chart of FIG. 2. If sensed oil temperature is below a threshold temperature, then step 204 directs the algorithm to step 216, else to step 206.

If a transmission hydraulic flow demand exceeds a certain threshold, Z, then step 206 directs the algorithm to step 216, else to step 208. This will cover any transmission event that would need the extra flow resulting from the boost condition. For example, this could occur if a shift is commanded in a powershift transmission (not shown) or a high speed movement of a hydrostatic module (not shown) in an IVT. The flow threshold "Z" could be modified based on tractor operating conditions.

If oil pressure (sensed by pressure sensor 54 is below a threshold pressure, then step 208 directs the algorithm to step 216, else to step 210.

If engine speed is below a certain lower threshold speed X, then step 210 directs the algorithm to step 216, else to step 212.

If engine speed is above a certain higher threshold speed Y, then step 212 directs the algorithm to step 218, else to step 214. Threshold speed X is greater than threshold speed Y.

If engine speed is between threshold speeds X and Y, then if drivetrain power is below a threshold, then step 214 directs the algorithm to step 216, else to step 218. Drivetrain power could be detected by engine load or sensed by a torque sensor (not shown). This would be useful for an IVT hydrostatic module which has higher flow requirements in the first system at high load than low load.

Step 216 de-energizes solenoid 84 of the boost pilot valve 80 which causes boost valve 70 to block communication between pump 30 with second (lube/cooling) system 13 so that pump 30 can provide a boost to the output of pump 16 and to the first system 11.

Step 218 energizes solenoid 84 of the boost pilot valve 80 which causes boost valve 70 to communicate pump 30 with second (lube/cooling) system 13.

Thus, what can happen is that the high pressure first system flow requirements increase as the drivetrain load increases due to hydro module leakage and cooling needs. There is then an interaction between engine speed and drivetrain power. If the engine speed is below speed X, then the boost valve should turned on. If engine speed is above the higher threshold speed Y, the boost valve should not be turned on. But for engine speeds between thresholds X and Y, then the boost valve should turned on only if the drivetrain power exceeds a certain level.

Thus, the ECU 68 can control flow from the low pressure pump 30 into the high pressure system 11 when higher flow is demanded in the high pressure first system, or the speed of electric motor pump 16 can be adjusted to provide more flow when higher flow is demanded in the high pressure system 11. The ECU 68 can also control the interaction of the systems 11 and 13 and the speed of pump 16 in response to electronic transmission shift inputs to boost flow where needed prior to shift events or other high flow demands.

Thus, the ECU 68 can shift the boost valve 70 electronically under several conditions:

Low engine speed when mechanically driven pump flows are limited by drive speed.

When a pressure drop in the first system 11 is anticipated, such as cold oil temperatures and transmission events such as shifting clutches and brakes, and IVT hydro stroking.

Unanticipated events when low pressure is identified in the first system 11 by a pressure sensor 54, such as caused by excessive leakage, pump 16 efficiency loss due to wear or failure, or pump 16 drive failure (electrical or mechanical).

In addition, the schematic shows the boost valve 70 in the boost position at engine start to ensure oil goes to the first system 11 first. It must be electronically shifted to the cooler/lubrication position. If electrical power is lost it will default back to the boost position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydraulic system for a vehicle driven by an internal combustion engine, comprising:

a first higher pressure hydraulic system comprising a first hydraulic subsystem and a second hydraulic subsystem;

a second lower pressure hydraulic system comprising a third hydraulic subsystem;

a first pump supplying hydraulic fluid to the first hydraulic; system at said higher pressure;

a second pump normally supplying hydraulic fluid to the second system at a lower pressure;

a first valve having an inlet connected to the first pump and an outlet connected to the second subsystem, the first valve being operable to control communication between the first pump and the second subsystem;

a second valve having an inlet connected to the second pump, a first outlet connected to the first subsystem and a second outlet connected to the second system, the second valve normally being in a first position wherein its second outlet is blocked and its inlet is connected to the first outlet, and the second valve being movable to a second position wherein its inlet is connected to its first and second outlets, the second valve comprises a pilot operated boost valve movable to an open position in response to pressure in a pilot line; and a solenoid operated pilot valve controls pressure in the pilot line.

2. The hydraulic system of claim 1, wherein:

the first pump is driven by an electric motor electrically powered by a generator driven by the engine; and the second pump is driven purely mechanically by the engine.

3. The hydraulic system of claim 1, wherein:

the first outlet of the second valve is connected to the first system via a check valve which prevents fluid flow from the first system to the second valve.

4. The hydraulic system of claim 1, wherein:

the first pressure is higher than the second pressure.

5. The hydraulic system of claim 1, further comprising:

a controller operatively coupled to the second valve.

6. A hydraulic system for a vehicle driven by an internal combustion engine, comprising:

a first circuit comprising a first pump and a first hydraulic subsystem, the first pump supplying hydraulic fluid to the first subsystem at a first pressure;

a second circuit comprising a second pump and a second hydraulic subsystem, the second pump supplying hydraulic fluid to the second subsystem at a second pressure lower than the first pressure;

a first valve having an inlet connected to the first pump and an outlet connected to the second circuit, the first valve being operable to control communication between the first pump and the second circuit; and a second valve having an inlet connected to the second pump, a first outlet connected to the first circuit and a second outlet connected to the second circuit, the second valve being operable to communicate the second pump with the first circuit when pressure in the first circuit is less than a second threshold pressure, the first valve is operable to communicate the first pump with the second circuit when pressure in the first circuit exceeds a first threshold pressure.

7. The hydraulic system of claim 6, wherein:

the first outlet of the second valve is connected to the first circuit via a check valve which prevents fluid flow from the first circuit to the second valve.

8. The hydraulic system of claim 6, wherein:

the first pump is driven by an electric motor electrically powered by a generator driven by the engine; and the second pump is driven purely mechanically by the engine.

9. A hydraulic system for a vehicle driven by an internal combustion engine, comprising:

a first circuit comprising a first pump and a hydraulic transmission control system, the first pump supplying hydraulic fluid to the hydraulic transmission control system at a first pressure;

a second circuit comprising a second pump and a hydraulic transmission lube/cooling system, the second pump supplying hydraulic fluid to the hydraulic transmission lube/cooling system at a second pressure lower than the first pressure;

a first valve having an inlet connected to the first pump and an outlet connected to the hydraulic transmission lube/cooling system, the first valve being operable to communicate the first pump with the hydraulic transmission lube/cooling system when pressure in the hydraulic transmission control system exceeds a first threshold pressure; and a second valve having an inlet connected to the second pump, a first outlet connected to the hydraulic transmission control system and a second outlet connected to the transmission lube/cooling system, the second valve being operable to communicate the second pump with the hydraulic transmission control system when pressure in the hydraulic transmission control system is less than a second threshold pressure.

10. The hydraulic system of claim 9, wherein:

the first outlet of the second valve is connected to the transmission control system via a check valve which prevents fluid flow from the transmission control system to the second valve.

11. The hydraulic system of claim 9, wherein:

the second valve comprises a pilot operated boost valve movable to an open position in response to pressure in a pilot line; and a solenoid operated pilot valve for controlling pressure in the pilot line.

12. The hydraulic system of claim 9, wherein:

the first pump is driven by an electric motor electrically powered by a generator driven by the engine; and the second pump is driven purely mechanically by the engine.

13. A hydraulic system for a vehicle driven by an internal combustion engine, comprising:

a first higher pressure hydraulic system comprising a first hydraulic subsystem and a second hydraulic subsystem, the first system comprising a transmission control circuit;

a second lower pressure hydraulic system comprising a third hydraulic subsystem;

a first pump supplying hydraulic fluid to the first hydraulic system at said higher pressure;

a second pump normally supplying hydraulic fluid to the second system at a lower pressure;

a first valve having an inlet connected to the first pump and an outlet connected to the second subsystem, the first valve being operable to control communication between the first pump and the second subsystem; and a second valve having an inlet connected to the second pump, a first outlet connected to the first subsystem and a second outlet connected to the second system, the second valve normally being in a first position wherein its second outlet is blocked and its inlet is connected to the first outlet, and the second valve being movable to a second position wherein its inlet is connected to its first and second outlets.

14. A hydraulic system for a vehicle driven by an internal combustion engine, comprising:

a first higher pressure hydraulic system comprising a first hydraulic subsystem and a second hydraulic subsystem;

a second lower pressure hydraulic system comprising a third hydraulic subsystem, the second system comprising a transmission lube circuit;

a first pump supplying hydraulic fluid to the first hydraulic system at said higher pressure;

a second pump normally supplying hydraulic fluid to the second system at a lower pressure;

a first valve having an inlet connected to the first pump and an outlet connected to the second subsystem, the first valve being operable to control communication between the first pump and the second subsystem; and a second valve having an inlet connected to the second pump, a first outlet connected to the first subsystem and a second outlet connected to the second system, the second valve normally being in a first position wherein its second outlet is blocked and its inlet is connected to the first outlet, and the second valve being movable to a second position wherein its inlet is connected to its first and second outlets.

15. A hydraulic system for a vehicle driven by an internal combustion engine, comprising:

a first higher pressure hydraulic system comprising a first hydraulic subsystem and a second hydraulic subsystem;

second lower pressure hydraulic system comprising a third hydraulic subsystem, the second system comprising at least one of a transmission cooler circuit and a transmission lube circuit;

a first pump supplying hydraulic fluid to the first hydraulic system at said higher pressure;

a second pump normally supplying hydraulic fluid to the second system at a lower pressure;

a first valve having an inlet connected to the first pump and an outlet connected to the second subsystem, the first valve being operable to control communication between the first pump and the second subsystem; and a second valve having an inlet connected to the second pump, a first outlet connected to the first subsystem and a second outlet connected to the second system, the second valve normally being in a first position wherein its second outlet is blocked and its inlet is connected to the first outlet, and the second valve being movable to a second position wherein its inlet is connected to its first and second outlets.

16. A hydraulic system for a vehicle driven by an internal combustion engine, comprising:

a first higher pressure hydraulic system comprising a first hydraulic subsystem and a second hydraulic subsystem;

a second lower pressure hydraulic system comprising a third hydraulic subsystem;

a first pump supplying hydraulic fluid to the first hydraulic system at said higher pressure;

a second pump normally supplying hydraulic fluid to the second system at a lower pressure;

a first valve having an inlet connected to the first pump and an outlet connected to the second subsystem, the first valve being operable to control communication between the first pump and the second subsystem, the first valve is operable to communicate the first, pump with the second system when pressure in the first system exceeds a first threshold pressure; and a second valve having an inlet connected to the second pump, a first outlet connected to the first subsystem and a second outlet connected to the second system, the second valve normally being in a first position wherein its second outlet is blocked and its inlet is connected to the first outlet, and the second valve being movable to a second position wherein its inlet is connected to its first and second outlets.

17. A hydraulic system for a vehicle driven by an internal combustion engine, comprising:

a first circuit comprising a first pump and a first hydraulic subsystem, the first pump supplying hydraulic fluid to the first subsystem at a first pressure;

a second circuit comprising a second pump and a second hydraulic subsystem, the second pump supplying hydraulic fluid to the second subsystem at a second pressure lower than the first pressure;

a first valve having an inlet connected to the first pump and an outlet connected to the second circuit, the first valve being operable to control communication between the first pump and the second circuit;

a second valve having an inlet connected to the second pump, a first outlet connected to the first circuit and a second outlet connected to the second circuit, the second valve being operable to communicate the second pump with the first circuit when pressure in the first circuit is less than a second threshold pressure, the second valve comprises a pilot operated boost valve movable to an open position in response to pressure in a pilot line; and a solenoid operated pilot valve for controlling pressure in the pilot line.

* * * * *